(12) United States Patent
Sahinoja et al.

(10) Patent No.: US 7,734,728 B2
(45) Date of Patent: Jun. 8, 2010

(54) ADDRESSING A MANAGEMENT OBJECT

(75) Inventors: Mikko Sahinoja, Tampere (FI); Eero Kaappa, Tampere (FI)

(73) Assignee: Nokia Corporation, Espoo (FI)

( * ) Notice: Subject to any disclaimer, the term of this patent is extended or adjusted under 35 U.S.C. 154(b) by 1388 days.

(21) Appl. No.: 10/665,878

(22) Filed: Sep. 19, 2003

(65) Prior Publication Data

US 2004/0109454 A1 Jun. 10, 2004

(30) Foreign Application Priority Data

Sep. 20, 2002 (FI) ................................ 20021683

(51) Int. Cl.
G06F 15/16 (2006.01)
G06F 15/177 (2006.01)
G06F 7/00 (2006.01)
G06F 17/00 (2006.01)

(52) U.S. Cl. ................... 709/219; 709/223; 707/103 R; 707/103 X; 707/103 Y; 707/103 Z

(58) Field of Classification Search ......... 709/223–224, 709/219; 370/395.5; 719/316; 707/103 R, 707/103 X–103 Z See application file for complete search history.

(56) References Cited

U.S. PATENT DOCUMENTS

| 6,131,118 | A * | 10/2000 | Stupek et al. ............... 709/223 |
| 6,243,746 | B1 | 6/2001 | Sondur et al. |
| 6,253,254 | B1 * | 6/2001 | Erlenkoetter et al. ........ 719/316 |
| 6,505,048 | B1 | 1/2003 | Moles et al. |
| 6,640,097 | B2 * | 10/2003 | Corrigan et al. .......... 455/414.1 |
| 6,754,799 | B2 * | 6/2004 | Frank ......................... 711/216 |
| 6,950,864 | B1 * | 9/2005 | Tsuchiya .................... 709/223 |
| 6,978,453 | B2 | 12/2005 | Rao et al. |
| 7,369,851 | B2 | 5/2008 | Okkonen et al. |
| 2002/0002606 | A1 | 1/2002 | Jaffe |
| 2002/0032691 | A1 * | 3/2002 | Rabii et al. .................. 707/200 |
| 2002/0129331 | A1 | 9/2002 | Zhang et al. |
| 2002/0133570 | A1 * | 9/2002 | Michel ....................... 709/219 |
| 2003/0081557 | A1 * | 5/2003 | Mettala et al. .............. 370/252 |
| 2003/0084177 | A1 | 5/2003 | Mulligan |

(Continued)

FOREIGN PATENT DOCUMENTS

EP 1 235 407 A2 8/2002

(Continued)

OTHER PUBLICATIONS

Feb.15, 2002, "SyncML Device Management Protocol," v.1.1, Feb. 15, 2002, 37 pgs.

(Continued)

Primary Examiner—Philip J Chea
(74) Attorney, Agent, or Firm—Hollingsworth & Funk, LLC

(57) ABSTRACT

The invention relates to a method of addressing a management object in a device management system, wherein at least one management object is added to a manageable client device. The method comprises retrieving a content of a predetermined data element from information in the management object. At least part of the content of said data element is coded using a predetermined coding algorithm. At least part of the content of said data element, in coded form, is assigned as an identifier for the management object. The identifier is used to address the management object.

14 Claims, 3 Drawing Sheets

U.S. PATENT DOCUMENTS

2003/0103484 A1* 6/2003 Oommen et al. ............ 370/338
2004/0098715 A1* 5/2004 Aghera et al. ............... 717/173
2005/0039178 A1 2/2005 Marolia et al.
2006/0039564 A1 2/2006 Rao

FOREIGN PATENT DOCUMENTS

| WO | WO9963767 | 12/1999 |
| WO | WO 02/052872 A2 | 7/2002 |
| WO | WO 02/087188 | 10/2002 |

OTHER PUBLICATIONS

Feb. 15, 2002, "SyncML Device Management Tree and Description", v.1.1, Feb. 15. 2002, 38 pgs.

Aug. 15, 2002, Wireless Application Protocol: WAP-292-ProvCont-20020815-d, draft version, Aug. 15, 2002, 73pgs.

* cited by examiner

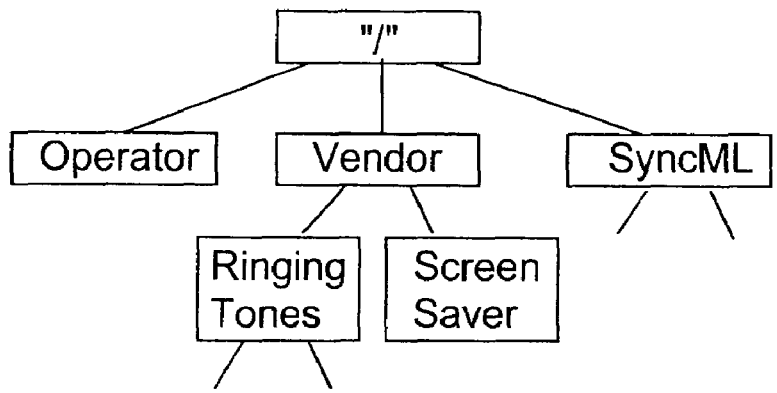
Fig. 1 - PRIOR ART
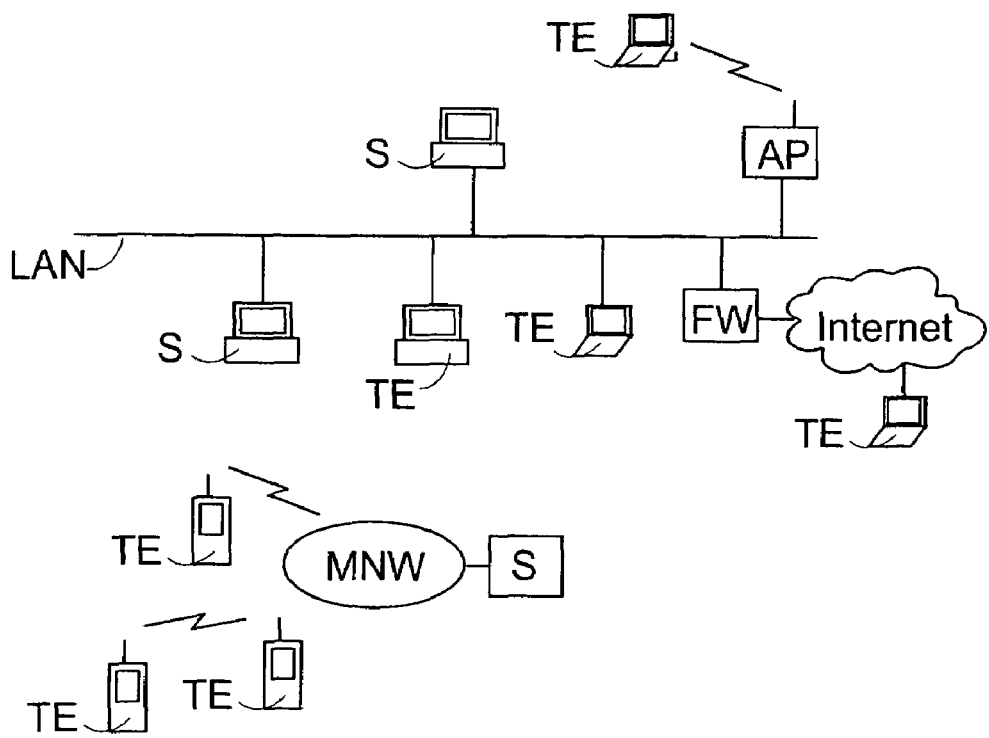
Fig. 2
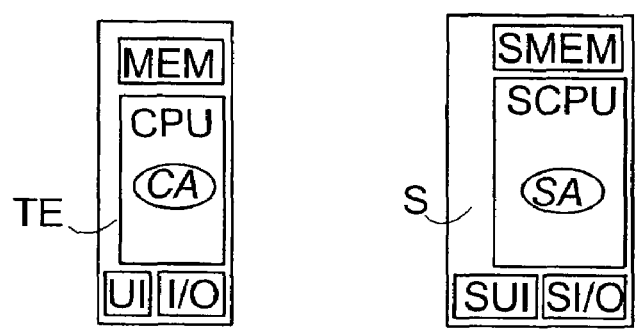
Fig. 3

ADDRESSING A MANAGEMENT OBJECT

BACKGROUND OF THE INVENTION

The invention relates to addressing a management object of a device in a device management system of the device.

The significance of device management is emphasized as the different data processing devices, such as mobile stations, become more complex. Various settings are required in the devices, such as settings associated with Internet access points, which are laborious and difficult to set manually by the user. Device management solutions have been developed for instance to solve this problem, by means of which for instance an administrator of a company's data system or a teleoperator is able to configure a device suitably. Usually device management refers to measures by which parties external to the device are able to change the configuration of the device, for instance change the settings or even some protocol used by the device. Not only setting associated with the device, but also user-specific data, such as user profiles, logos, ringing tunes and menus can be sent, allowing the user to modify the settings of the device into personal or the modification to take place automatically in association with device management.

One device management standard is SyncML device management (Synchronization Markup Language) based partly on the SyncML data synchronization standard enabling data synchronization. A synchronization server may serve as a device management server and a client device as the device management client. The client device acting as client from the point of view of device management sends information about itself (similarly to synchronization) to a management server performing device management in a session initiation message to the server, to which the management server responds by sending server management commands. The client device responds to these by status information, after which the server can end the session or send more server management commands. If the server sends more management commands, the client device should respond to these by status information. Having received status information, the server is always able to end the session or continue it by sending more device management commands. The device management protocol may also operate such that inquiries are first sent to the user about what he wants to update, and information about the user's selections is sent to the server. The server can then send the updates/operations requested by the user in the next packet.

In the client device, the matters to be managed are arranged as management objects. Management objects are entities in the client device and are manageable by the management server's management commands. The management object may be for instance an integer or a large entity, such as a background picture or a screensaver. In SyncML device management, the management objects are arranged in the form of a tree as a management tree, illustrated in FIG. 1. The management object may be a single parameter, a subtree or a data collection. For example, the management object 'Vendor' is a node, i.e. an interior object, since it has child objects 'Screen Saver' and 'Ringing Tones'. The management object 'Screen Saver' is a leaf object, since it has no child objects. The management object 'Ringing Tones' is also a node or an interior node, since it has child objects. The content of the management object may also be a link addressing another management object. Each object can be addressed using a URI identifier (Uniform Resource Identifier). The URI of a management object is created by starting at the root '/' and, traversing down the tree, each management object has a name, which is appended to the previous ones using '/' as the delimiting character. For example, the management object 'Ringing Tones' can be addressed using the URI identifier '/Vendor/Ringing Tones/'. At least some management objects are preferably standardized (the SyncML device management standards presently include three standardized management objects). The management objects may be permanent or dynamic. Dynamic management objects can be added to the management tree from the client device or the management server.

New dynamic management objects have to be assigned a name in the management tree (the name acting as the address) such that the management tree is the same both in the management server and in the client device. If the client device is allowed to freely decide the name to be added to the management tree, the management server does not have the same tree, and the management commands given by the management server cannot be implemented. When a unidirectional message (unacknowledged) is used, the name could in no way be updated in the server. An example of a new management node is a document including WAP provisioning settings. A new management object (having different settings as child objects) can be created from the document and the settings comprised by it. A WAP provisioning document may include parameters that appear several times (e.g. several alternative proxy servers), and these parameters cannot be arranged in a management tree. A solution has been suggested for selecting the name, wherein a new identifier field for distinguishing the different properties from each other in the management tree is added to the management information, e.g. the WAP provisioning document. In this case, the address of the management object would have at least one more identifier, which would make the address still longer. For instance, in the case of the WAP protocol, changes would also have to be made to the WAP standard.

BRIEF DESCRIPTION OF THE INVENTION

An object of the invention is thus to provide a method and an apparatus for implementing the method so as to avoid the above problems associated with naming. The objects of the invention are achieved by a method, a device management system, electronic devices and computer program product, which are characterized by what is stated in the independent claims. Some preferred embodiments of the invention are described in the dependent claims.

In accordance with the invention, the content of a predetermined data element is retrieved from the management object data. At least part of the content of said data element is coded using a predetermined coding algorithm. At least part of the content of said data element, in a coded form, is assigned as identifier to the management object, and the identifier assigned is used to address the management object.

A management object generally refers to an entity that is associated with device management and can be configured by a third party, e.g. to the settings of an Internet access point, without restriction to the management objects of SyncML device management. A data element generally refers to a record in a management object, having a predetermined identifier, e.g. to a data element according to the XML language, whose content may include one or more subelements and/or values (in any form defined for the element). Device management is not restricted to functions defined in SyncML, but it is to be understood to broadly refer to device management performed between any manageable client device and device management server and to messages required for it.

An advantage of the solution of the invention is that the method can be implemented both in a management server performing device management and in a manageable (client) device, the same identifier being defined for the management object in both of them, thus eliminating errors due to naming carried out in different ways. A significant advantage is also that new fields do not have to be defined in the standards for the naming, i.e. changes in standards (e.g. WAP) often already implemented by the available devices and the problems caused by the changes can be avoided.

In accordance with a preferred embodiment of the invention, the coding algorithm is a hash algorithm. In this case, the need of storage capacity is smaller, since the identifiers can be considerably abbreviated. The organization and management of management objects is also easier in e.g. a SyncML management protocol management tree because of the compact form of presentation.

BRIEF DESCRIPTION OF THE FIGURES

In the following, preferred embodiments of the invention will be described in detail with reference to the accompanying drawings, in which
FIG. 1 illustrates a management tree;
FIG. 2 illustrates a management system;
FIG. 3 illustrates a server and a client device.

DETAILED DESCRIPTION OF THE INVENTION

Figure 4:
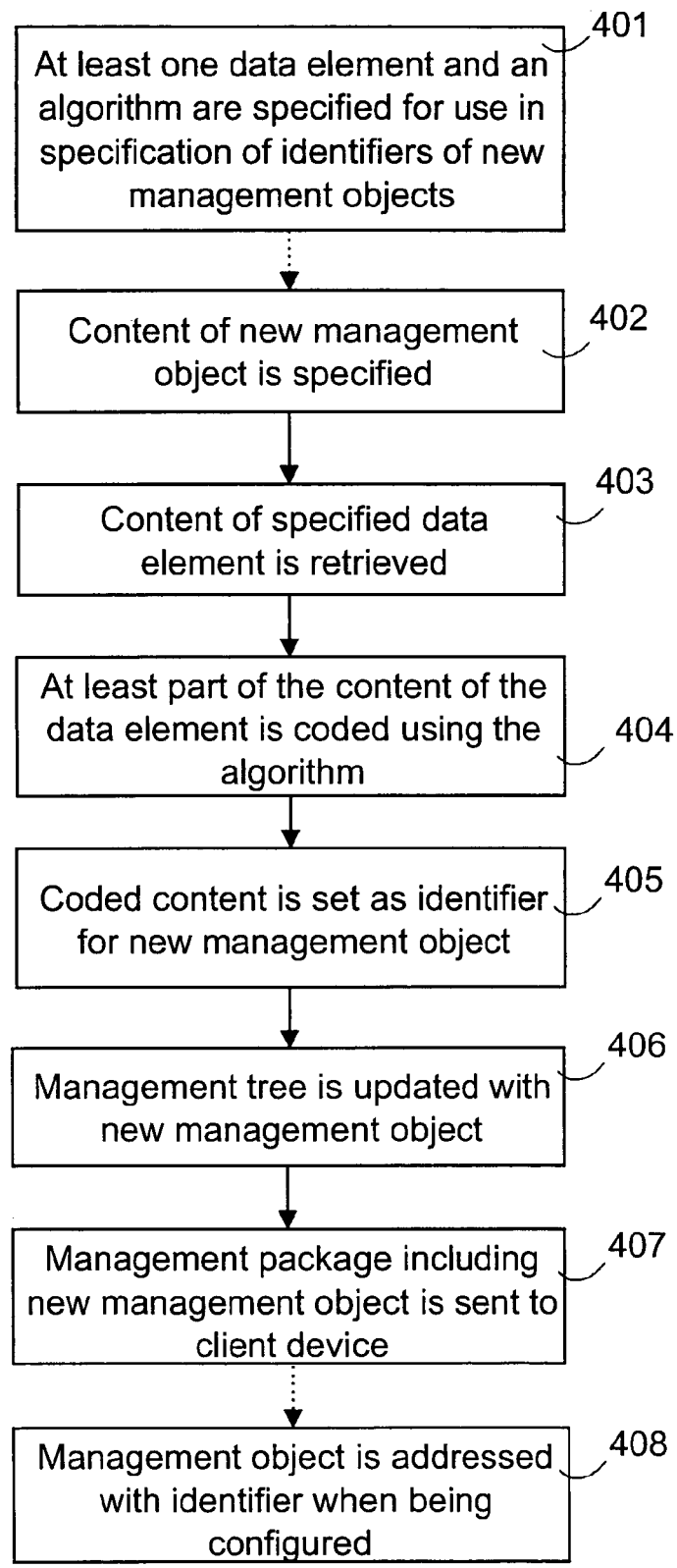
FIG. 4 illustrates a method according to a preferred embodiment of the invention.

In the following, a preferred embodiment of the invention will be described in a system supporting management of a SyncML device, but is should be noted, however, that the invention is applicable to any device management system enabling the organization of management objects of the device also in other ways than as a tree structure.

FIG. 2 illustrates a networked system. A network server or PC typically acts as a server S. A TE is typically a mobile phone, a PC (Personal Computer), laptop computer or a PDA device. The assumption in the following embodiments is that from the point of view of device management, the terminal TE serves as the client device and the server S as the management server. The server S may manage several client devices TE.

FIG. 2 shows two examples, client devices TE and management servers S being connected to a local area network LAN in the first one. The client device TE connected to the network LAN comprises a functionality, e.g. a network card and software controlling data transfer, for communication with the devices of the network LAN. The local area network LAN may be any type of local area network, and the TE may communicate with the server S also via the Internet typically using a firewall FW. The terminal TE may be connected to the local area network LAN also wirelessly via an access point AP.

In the second example, the client device TE communicates with the server S via a mobile network MNW. The terminal TE, connected to the network MNW, comprises a mobile station functionality for wireless communication with the network MNW. Other networks may also exist between the mobile network MNW and the server S, such as a local area network LAN. The mobile network MNW may be any known wireless network, e.g. a network supporting the GSM service, a network supporting the GPRS service (General Packet Radio Service), a third generation mobile network, such as a network according to the network specifications of the 3GPP ($3^{rd}$ Generation Partnership Project), a wireless local area network WLAN, a private network or a combination of networks. An important service in the transport layer in several mobile networks is the WAP, the WSP layer (Wireless Session Protocol) comprised by which is used to provide transport service to the device management application layer in the client device TE and the server S. In this case, the system comprises at least one WAP gateway and optionally one or more WAP proxy servers. The WAP supports many lower-level transfer techniques, such as the HTTP or OBEX standards. Lower-level transfer techniques can be used such as circuit or packet-switched data transfer or SMS-based transfer in accordance with the properties of the underlying mobile network MNW. In addition to the examples of FIG. 2, other device management configurations are also feasible.

As FIG. 3 illustrates, the terminal TE and the server S comprise memory MEM; SMEM, a user interface UI; SUI, I/O means I/O; SI/O for arranging data transfer, and a central processing unit CPU; SCPU comprising one or more processors. The memory MEM; SMEM includes a non-volatile portion of the central processing unit CPU; SCPU for storing controlling applications and other data to be stored, and a volatile portion for use for temporary data processing. In the memory MEM of the TE, management objects are stored, of whose structure a management tree is maintained also in the memory SMEM of the server S.

The TE, operating as a client device according to the SyncML device management standard, comprises a client agent CA that attends to functions associated with a management session in the client device. The device S operating as the management server comprises a server agent SA attending to the management session. The client agent CA can be implemented by executing a computer program code stored in the memory MEM in the CPU and the SA by executing a computer program code stored in the memory SMEM in the SCPU. As was stated before, the TE and the S may operate as the management server and/or the client device. Consequently, e.g. the terminal TE may also comprise at least partly the functions of the server agent SA, allowing it to operate as a management server in a session between the terminals TE. The computer program codes executed in the central processing units CPU and SCPU can be used to make the terminal TE and the server S also implement the inventive means associated with adding and addressing management objects, some embodiments thereof being illustrated in FIGS. 4 and 5. The computer program may be stored in any memory means, e.g. a hard disk in a PC or a CD ROM, from where it can be loaded in the memory MEM; SMEM of the executing device TE; S. The computer program may also be loaded via a network using the TCP/IP protocol stack, for example. It is also possible to use hardware solutions or a combination of hardware and software solutions to implement the inventive means.

In accordance with a preferred embodiment of the invention, a new management object is given an identifier, with which the management object is addressed in the management tree, based on a predetermined part of the content of the management object. Management objects are typically based on the XML language. For XML-based documents, a document type definition DTD is specified, which in the XML language specifies the tags used, the structural relations of the elements (!ELEMENT) between the tags, and other usable specifications of the XML documents. As is well known in the XML language, a data element begins with an initial identifier (e.g. <section>) and ends in an end identification (</section>), and it may include text or other elements. The DTD is present in all documents sent or a reference is made therein to a known DTD. In accordance with a preferred embodiment, an identifier is specified for a management object based on the content of the data element of the management document, which is illustrated in detail below.

FIG. 4 illustrates a method of a preferred embodiment, which is executable in the management server S. One or more data elements, and preferably also one or more algorithms are predetermined 401 for deriving the identifiers of new (dynamic) management objects. A name is specified for the management object based on the content of a pre-selected data element using at least part of the content, e.g. the content of a given field in the data element. The data element may be any record in the management object, e.g. one character, a given subrecord or a child node. The specified data element may be management object-specific, i.e. different data elements are used for different management objects, or the same data element, e.g. a time stamp, can be used for many or all management objects for specifying the identifier. The same holds true for the algorithms. Examples of possible data elements and algorithms are presented later. Step 401 can be executed already during the manufacture of the device, or the data elements/algorithms used can be negotiated e.g. at the device management session set stage.

When a new management object is to be added, the content of the new management object is specified 402. The new management object to be added can be of any object type, such as an internal object, a leaf object or a link object. The content of the management object may be e.g. a WAP provisioning document, the subelements included in which (called attributes) can be added as special nodes and/or leaves in the management tree. The compilation of the content of the management object depends on the management settings involved; typically all settings concerning a given application, e.g. an e-mail application, are compiled as the content of one management object.

The content of a predetermined (in step 401) management object is retrieved 403 in order to be able to name the new management object. In accordance with a preferred embodiment, the content is coded 404 using a predetermined algorithm. The algorithm may be any algorithm. In accordance with a preferred embodiment, the algorithm is a hash algorithm, making the size smaller. The algorithm may be for instance such that it restricts the identifier obtained based on the coding to a given length. Some usable algorithms include MD5, SHA-1, RIPEMD-160.

The coded content is set 405 in the management tree as the identifier of the new management object. The management tree can be updated 406 (or if it does not exist, it can be created) with the new management object. In this case, the identifier of the new management object set in step 405 is added to the management tree under the root or under a management object added previously, and the identifiers of any child objects (internal objects and/or leaf objects) coming under the new management object are added under it. The identifier thus becomes the name of the management object in the management tree and it is used to address the management object. The management server may send 407 a management package including the new management object to a client device. For this purpose, the mechanisms of the management protocol of the device and messages specified for it can be utilized; as for a more detailed description of the SyncML device management protocol, reference is made to the SyncML organization specification '*SyncML Device Management Protocol*', version 1.1, 15 Feb. 2002, 37 pages. Later, when the data of said management object are retrieved (GET), it is modified (REPLACE) or deleted (DELETE), it is addressed 408 using the identifier set in step 405. As for other details associated with the management objects and the management tree according to the SyncML device management, reference is made to the SyncML organization specification '*SyncML Device Management Tree and Description*', version 1.1, 15 Feb. 2002, 38 pages, where the content of the field 'Name' specified in the properties of a management object in paragraph 6 can be specified in the manner illustrated above.

Figure 5:
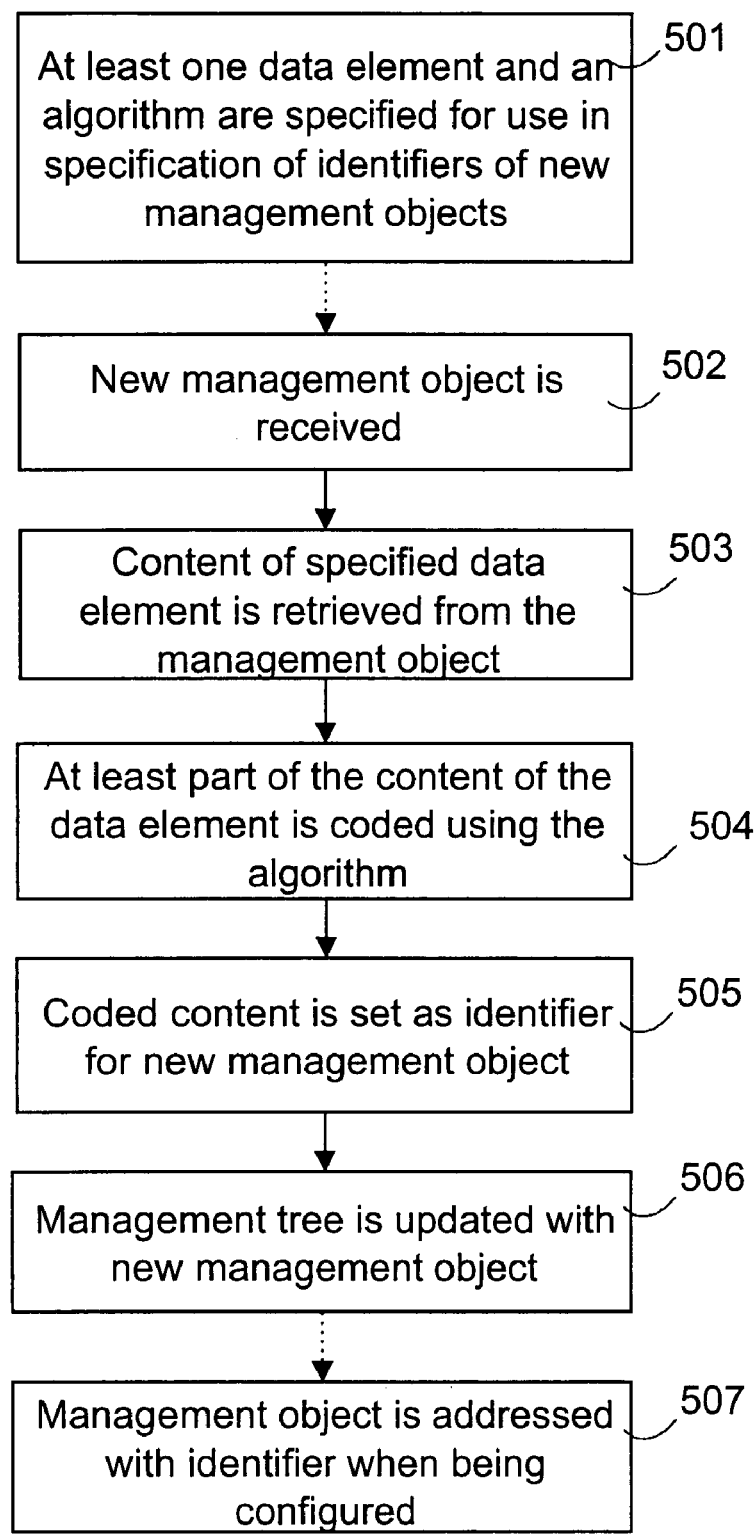
FIG. 5 illustrates a method according to another preferred embodiment of the invention.

FIG. 5 illustrates a method of a preferred embodiment, which can be executed in the client device TE. Referring to the description of step 401 in FIG. 4, at least one data element and algorithm are also specified 501 in the client device for use in the identification of new management objects. When a new management object is received 502 at a client device preferably in a management package, the content of a predetermined data element is retrieved 503 from the received management object. As for the coding, identifier setting and management tree update to be executed in steps 504 to 506, reference is made to what was described for steps 404 to 406 in FIG. 4, i.e. the procedure can be the same in the client device as in the management server. When there is need to use the management object, it is addressed 507 using said identifier. Accordingly, no acknowledgement is required from the terminal TE regarding the addition of the management object to the management tree, or particularly information about the identifier defined for it back to the management server. This would not even be possible in the case of a unidirectional management command.

It is important to note that the embodiments illustrated in FIGS. 4 and 5 can be applied by only using part of the content of the data element for defining an identifier for a management object. For example, the value of a subfield of a given data element can be used in step 404, 504.

In accordance with an embodiment, coding step 405, 505 is not executed, but the content of the data element or at least part thereof is directly selected (406, 506) as the identifier.

It is to be noted that at least part of the steps shown in FIGS. 4 and 5 can be executed in a different order, e.g. the management tree could be updated (406) only after the management object is sent (407) to the client device or when an acknowledgement or status information about the management package is received from the client device. It should also be noted that the method shown in FIGS. 4 and 5 is naturally applicable to naming the child objects of a new management object to be added, allowing also their identifiers to be coded short, ensuring that the identifiers of the child objects are also the same in the management server and in the client device.

In accordance with an embodiment, the contents of the data elements can be chained and the identifier created from the chained contents of the data elements. Also in this case, the chained content is preferably coded to reduce the size.

In accordance to still another embodiment, indexing is used. Identifiers or data element contents used to create them are indexed for instance using a running numbering, which ensures that several different management objects do not obtain the same identifier. In this case, for instance after step 402 and 502, there is a step wherein the content is indexed before coding. On the other hand, if a time stamp is used as the basis of the identifier, the same advantage is achieved.

In accordance with a preferred embodiment, the present method is applied to the transfer of WAP provisioning settings to the terminal TE. The method is particularly useful in a Bootstrap process, wherein the necessary WAP settings are sent one-way to a non-configured terminal TE (the Bootstrap process thus differs from typical device management, wherein a response (status) is sent from the terminal). The WAP settings can be transferred to the terminal utilizing the WAP protocol, after which a new management object has to be added to the management tree of the SyncML device management protocol. In this case the procedure can be as shown in FIGS. 4 and 5, i.e. a data element is specified 401, 501 at the terminal TE and the management server S (which may act as a trusted WAP provisioning server), the element preferably being one field in the WAP provisioning document (called characteristics and their parameters in the WP provisioning specifications). The management server executes steps 402 to 406, i.e. specifies a new WAP provisioning document content, specifies an identifier for the management object created by the WAP provisioning document and updates the management tree. The management server then sends 407 the WAP provisioning document to the terminal TE. The TE executes steps 502 to 506 in response to the message from the management server, i.e. specifies an identifier for the new management object, updates the management tree and also stores the content of the WAP provisioning document. The terminal TE then includes the required WAP configuration, which enables the use of WAP services without the user having to manually set the settings. This configuration can be later changed by addressing it by the specified identifier (steps 408, 507).

The data element selected in steps 401 and 501 can be e.g. ProvURL, which is a URI and specifies the path of the WAP provisioning server. The WAP specifications specify that this ProvURL identifier must not be shortened, and accordingly the identifier to be set in the management tree could become long, unless the ProvURL identifier is not hashed in steps 404 and 504. The ProvURL identifier may be a parameter of the Bootstrap characteristic:

```
...
<characteristic type="Bootstrap">
  <parm = "ProvURL" value="http:/www.operator.com/Trusted_WAP-Provisioning_Server/"/>
</characteristic>
...
```

In this example, without coding, the identifier could be '/http:/www.operator.com/Trusted_WAP-Provisioning-_Server/' if the WAP settings are directly under the root in the management tree. As for the other data elements of the WAP provisioning document (which can be used to specify the identifier), reference is made to the WAP Forum WAP specification WAP-292-ProvCont-20020815-d '*Provisioning Content, Draft Version* 15 Aug. 2002', 73 pages.

Another example is the addition of a new Internet access point to the terminal TE, whereby a node has to be added to the management tree for the new management object specifying the settings of the new access point using the Add command, this being illustrated below:

```
?xml version="1.0" encoding="UTF-8"?>
<Add>
    <CmdID>1</CmdID>
    <Item>
      <Target><LocURI>./AP/AP1</LocURI></Target>
      <Meta>
        <Format xmlns='syncml:metinf'>node</Format>
      </Meta>
    </Item>
</Add>
```

The management object identifier used can be specified using the method illustrated above, in this example, the identifier given is 'AP1', which is under the 'AP' node.

A third example of a management object is a management object specifying browser settings. Still other examples include management objects for synchronization settings and management objects for e-mail settings.

As distinct from the embodiments illustrated above, an identifier can be specified for a new management object by using some other information than the information obtained from the content of the management object. In this embodiment, any value of a predetermined field can be used in principle, provided it is the same both in the client device and in the management server. An example of this is the retrieval of the content of a field of a short message carrying a management object for use as the identifier of the management object (preferably coded). The use of a time stamp, for example, ensures that the identifier is unambiguous. The value (or part thereof) of a field (one or more) of a protocol lower than the management protocol of the device can also be used.

It is obvious to a person skilled in the art that as technology advances, the basic idea of the invention can be implemented in a variety of ways. The invention and its embodiments are thus not limited to the above examples, but may vary within the claims.

The invention claimed is:

1. An apparatus comprising a processor and a memory storing executable instructions that, in response to execution by the processor, cause the apparatus at least to:
   receive from a server information of at least one management object of a device management system,
   retrieve content of a predetermined data element for assigning an identifier for the device management object,
   index at least part of the content of said data element using running numbering,
   assign the indexed at least part of the content of said data element as an identifier for a device management object,
   add said identifier as a new entry in a management tree of the apparatus, and
   use said identifier to address the device management object in the device management tree.

2. The apparatus as claimed in claim 1, wherein the apparatus is configured to operate as a client device according to a SyncML device management protocol.

3. The apparatus as claimed in claim 1, wherein the apparatus is configured to add the device management object as a new device management object including provisioning settings from a provisioning document received during a bootstrap process.

4. An apparatus according to claim 1, wherein the apparatus is a mobile communications device.

5. A method comprising:
   receiving information of at least one management object of a device management system,
   retrieving content of a predetermined data element for assigning an identifier for the device management object,
   indexing at least part of the content of said data element using running numbering,
   assigning the indexed at least part of the content of said data element as an identifier for a device management object,
   adding said identifier as a new entry in a management tree, and
   using said identifier to address the device management object in the device management tree.

6. A method as claimed in claim 5, wherein the device management object is added as a new device management object including provisioning settings from a provisioning document received during a bootstrap process.

7. An apparatus comprising a processor and a memory storing executable instructions that, in response to execution by the processor, cause the apparatus at least to:
retrieve content of a predetermined data element for assigning an identifier for a device management object,
index at least part of the content of said data element using running numbering,
assign the indexed at least part of the content of said data element as an identifier for a device management object,
add said identifier as a new entry in a management tree of the apparatus,
use said identifier to address the device management object in the device management tree, and
transmit information of the management object to client device to arrange assignment of an identifier for addressing the management object similarly in the client device.

8. An apparatus comprising a processor and a memory storing executable instructions that, in response to execution by the processor, cause the apparatus at least to:
retrieve content of a predetermined data element for assigning an identifier for a device management object,
hash at least part of the content of said data element using a predetermined hashing algorithm,
assign the hashed at least part of the content of said data element as an identifier for a device management object,
add said identifier as a new entry in a management tree of the apparatus,
use said identifier to address the device management object of a device management tree, and
transmit information of the management object to a client device to arrange assignment of an identifier for addressing the management object similarly in the client device.

9. An apparatus according to claim 8, wherein the apparatus is a server supporting a SyncML device management protocol.

10. An apparatus according to claim 8, wherein the apparatus is configured to assign the identifier in connection with a bootstrap process.

11. A method, comprising:
retrieving content of a predetermined data element for assigning an identifier for a device management object,
hashing at least part of the content of said data element using a predetermined hashing algorithm,
assigning the hashed at least part of the content of said data element as an identifier for a device management object,
adding said identifier as a new entry in a management tree of the apparatus,
using said identifier to address the device management object of a device management tree, and
transmitting information of the management object to client device to arrange assignment of an identifier for addressing the management object similarly in the client device.

12. A method according to claim 11, wherein the identifier is assigned in connection with a bootstrap process.

13. An apparatus comprising a processor and a memory storing executable instructions that, in response to execution by the processor, cause the apparatus at least to:
receive from a server information of at least one management object of a device management system,
retrieve content of a predetermined data element for assigning an identifier for the device management object,
hash at least part of the content of said data element using a predetermined hashing algorithm,
assign the hashed at least part of the content of said data element as an identifier for a device management object,
add said identifier as a new entry in a management tree of the apparatus, and
use said identifier to address the device management object of a device management tree.

14. An apparatus according to claim 13, wherein the apparatus is a mobile communications device.

* * * * *